(12) United States Patent
Johnson

(10) Patent No.: US 10,788,258 B2
(45) Date of Patent: Sep. 29, 2020

(54) APPLIANCE GASKET WITH INTERNAL ARCUATE COMPONENT

(71) Applicant: Haier US Appliance Solutions, Inc., Wilmington, DE (US)

(72) Inventor: Eric Gerard Johnson, New Albany, IN (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 79 days.

(21) Appl. No.: 16/026,121

(22) Filed: Jul. 3, 2018

(65) Prior Publication Data
US 2020/0011590 A1 Jan. 9, 2020

(51) Int. Cl.
*F25D 23/00* (2006.01)
*F25D 23/08* (2006.01)
*E06B 7/23* (2006.01)

(52) U.S. Cl.
CPC .......... *F25D 23/087* (2013.01); *E06B 7/2309* (2013.01); *E06B 7/2312* (2013.01)

(58) Field of Classification Search
CPC ...... F24D 23/087; F16J 15/025; F16J 15/027; F16J 15/102; F16J 15/104; E06B 7/2309; E06B 7/2312; F25D 23/087; F25D 23/028; F25D 2201/10; F25D 2600/04; F25D 29/00; F25D 23/02; F25D 23/00; F25D 23/021; F25D 23/067; A47B 96/16; A47B 67/04
USPC ........ 277/630; 312/405, 296, 401; 49/475.1, 49/477.1, 489.1, 495.1, 498.1
See application file for complete search history.

(56) References Cited

U.S. PATENT DOCUMENTS

| | | | |
|---|---|---|---|
| 2,217,875 A | 10/1940 | Nauert | |
| 2,342,537 A * | 2/1944 | Geisler | E06B 3/9682 403/295 |
| 2,503,882 A * | 4/1950 | Medford | B29C 33/448 156/155 |
| 2,603,843 A | 7/1952 | Hill | |
| 2,889,593 A | 6/1959 | Harbison | |
| 2,899,720 A | 8/1959 | Vollmer | |
| 3,403,477 A | 10/1968 | Light | |
| 3,862,515 A * | 1/1975 | Baermann | E05C 19/161 49/478.1 |
| 3,952,455 A | 4/1976 | McAlarney | |
| 3,958,369 A * | 5/1976 | Mathellier | E06B 7/2309 49/479.1 |
| 4,024,876 A * | 5/1977 | Penrock | A41C 3/148 450/48 |
| 4,138,049 A | 2/1979 | McAlarney | |

(Continued)

FOREIGN PATENT DOCUMENTS

EP 1591727 * 11/2005

*Primary Examiner* — Janet M Wilkens
(74) *Attorney, Agent, or Firm* — Dority & Manning, P.A.

(57) ABSTRACT

A resilient gasket for an appliance defines a longitudinal direction. The gasket includes a base, a pocket attached to the base, and at least one internal component located within a chamber defined by the pocket. The internal component includes a first leg extending along the longitudinal direction of the gasket from a first end of the internal component to a first side of an arcuate portion of the internal component and a second leg extending along the longitudinal direction of the gasket from a second end of the internal component to a second side of the arcuate portion of the internal component.

20 Claims, 9 Drawing Sheets

(56) References Cited

U.S. PATENT DOCUMENTS

| | | | | |
|---|---|---|---|---|
| 4,248,017 | A | * | 2/1981 | Micallef ............... F24C 15/021 126/190 |
| 4,617,759 | A | | 10/1986 | Pasqualini et al. |
| 4,708,898 | A | * | 11/1987 | Gommier .............. E06B 7/2309 428/122 |
| 4,926,600 | A | | 5/1990 | Mesnel |
| 4,928,431 | A | * | 5/1990 | Kuzuhara ................ B60J 10/21 49/479.1 |
| 5,297,360 | A | * | 3/1994 | Besore .................. F25D 23/087 49/478.1 |
| 5,916,076 | A | | 6/1999 | Cittadini et al. |
| 6,015,122 | A | * | 1/2000 | Qui ......................... G09F 17/00 248/156 |
| 6,598,349 | B1 | * | 7/2003 | Balbaugh .................. E06B 7/16 49/475.1 |
| 2004/0031203 | A1 | * | 2/2004 | Russell .................... B60J 10/24 49/498.1 |
| 2008/0276540 | A1 | | 11/2008 | Kim |
| 2011/0006652 | A1 | * | 1/2011 | Veltrop ................ F25D 23/087 312/296 |
| 2013/0055644 | A1 | * | 3/2013 | Baratin .................... B60J 10/18 49/490.1 |
| 2013/0097937 | A1 | * | 4/2013 | Flasher .................. D06F 58/04 49/492.1 |
| 2016/0243973 | A1 | * | 8/2016 | Goode ...................... B60P 3/34 |
| 2018/0299189 | A1 | * | 10/2018 | Johnson ............... F25D 23/087 |

* cited by examiner

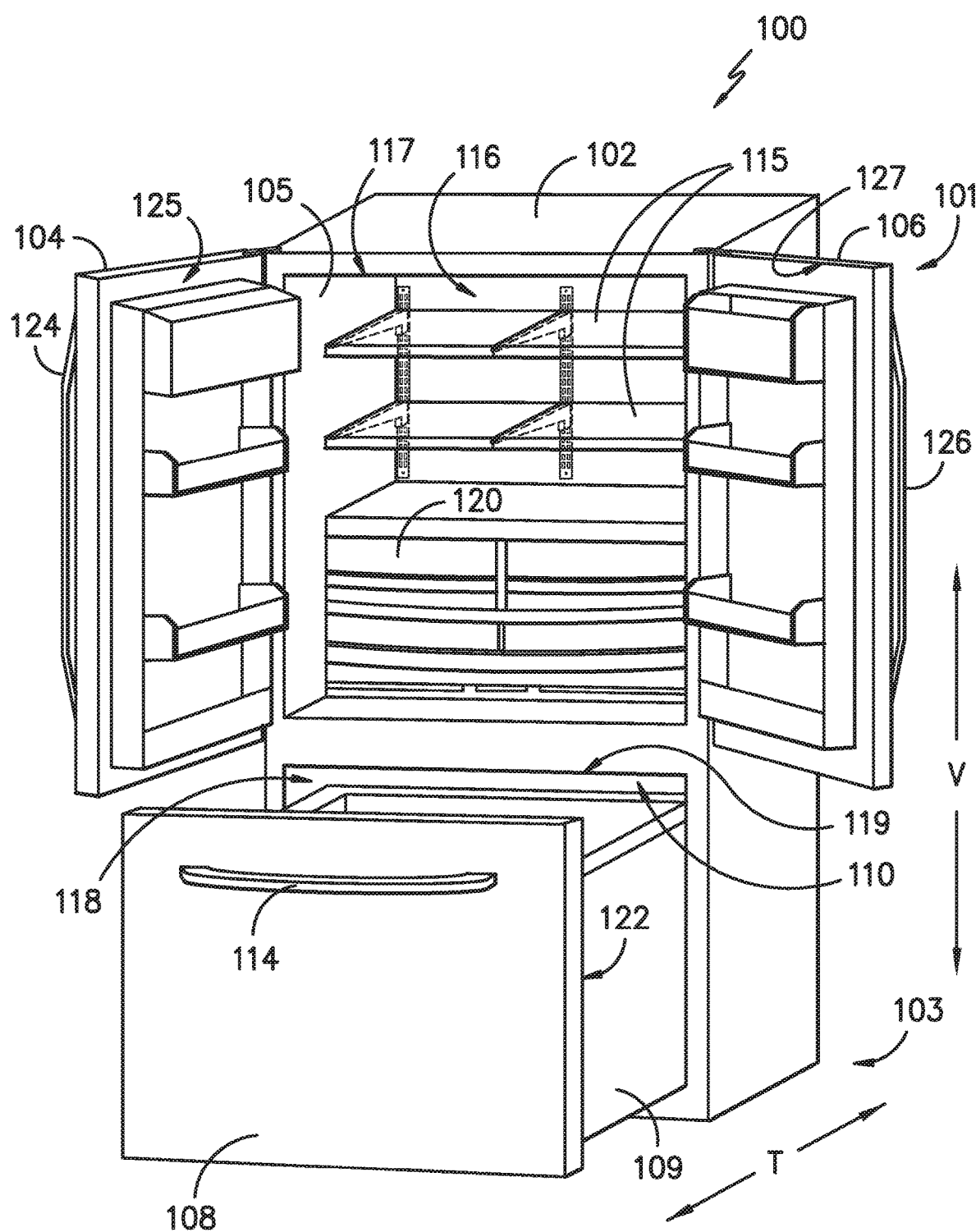
FIG. -1-

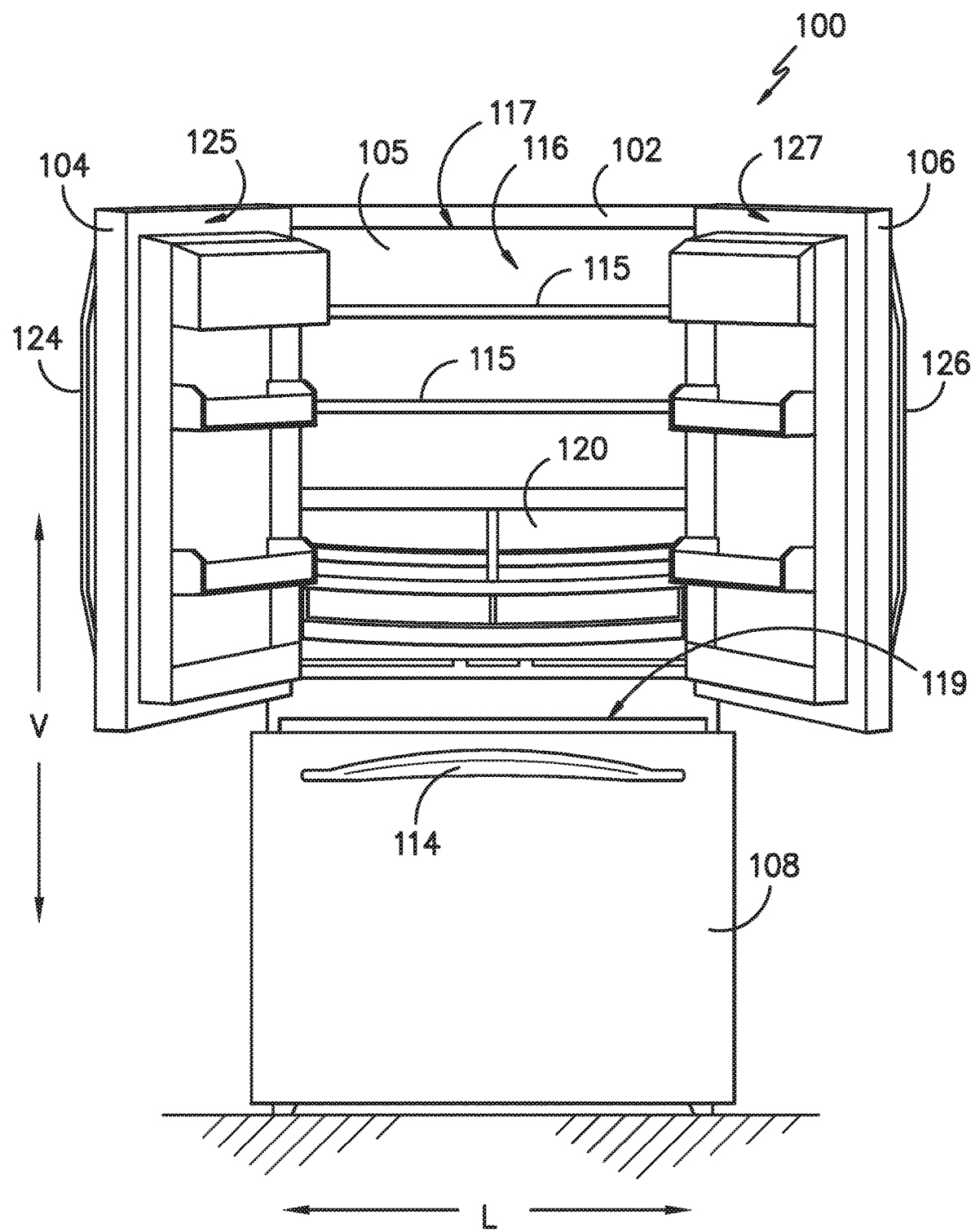
FIG. -2-

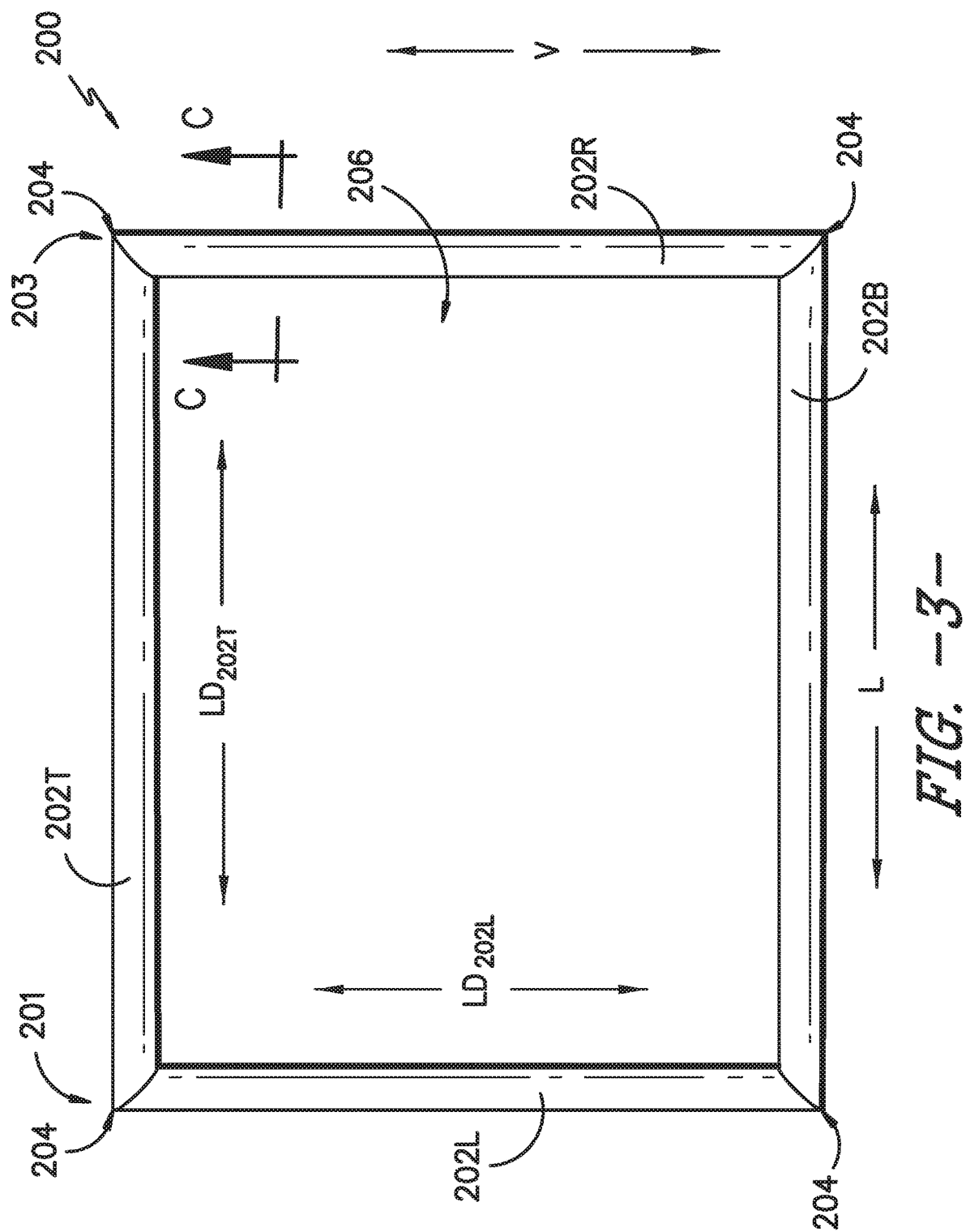
FIG. -3-

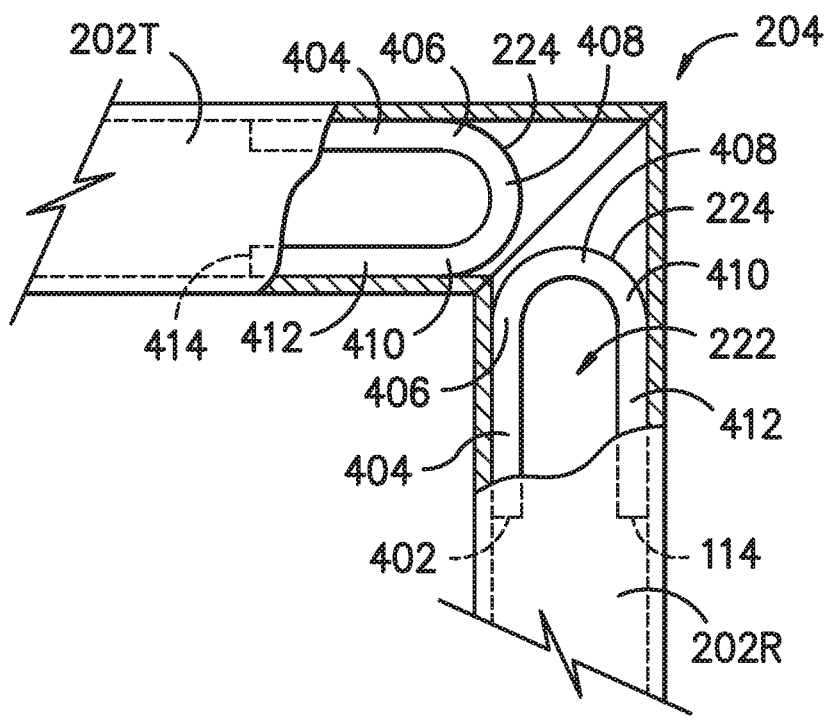
FIG. -4-
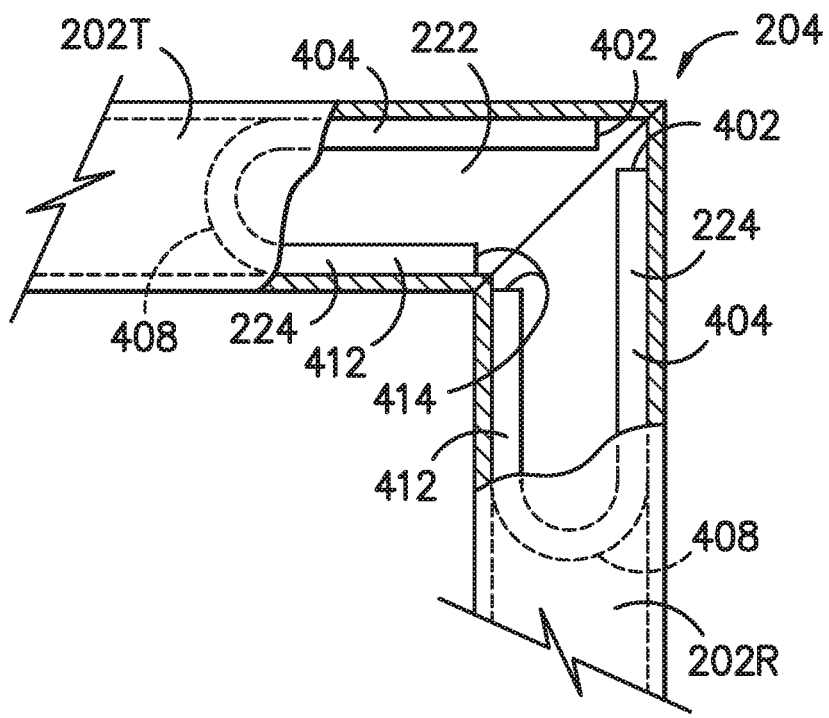
FIG. -5-

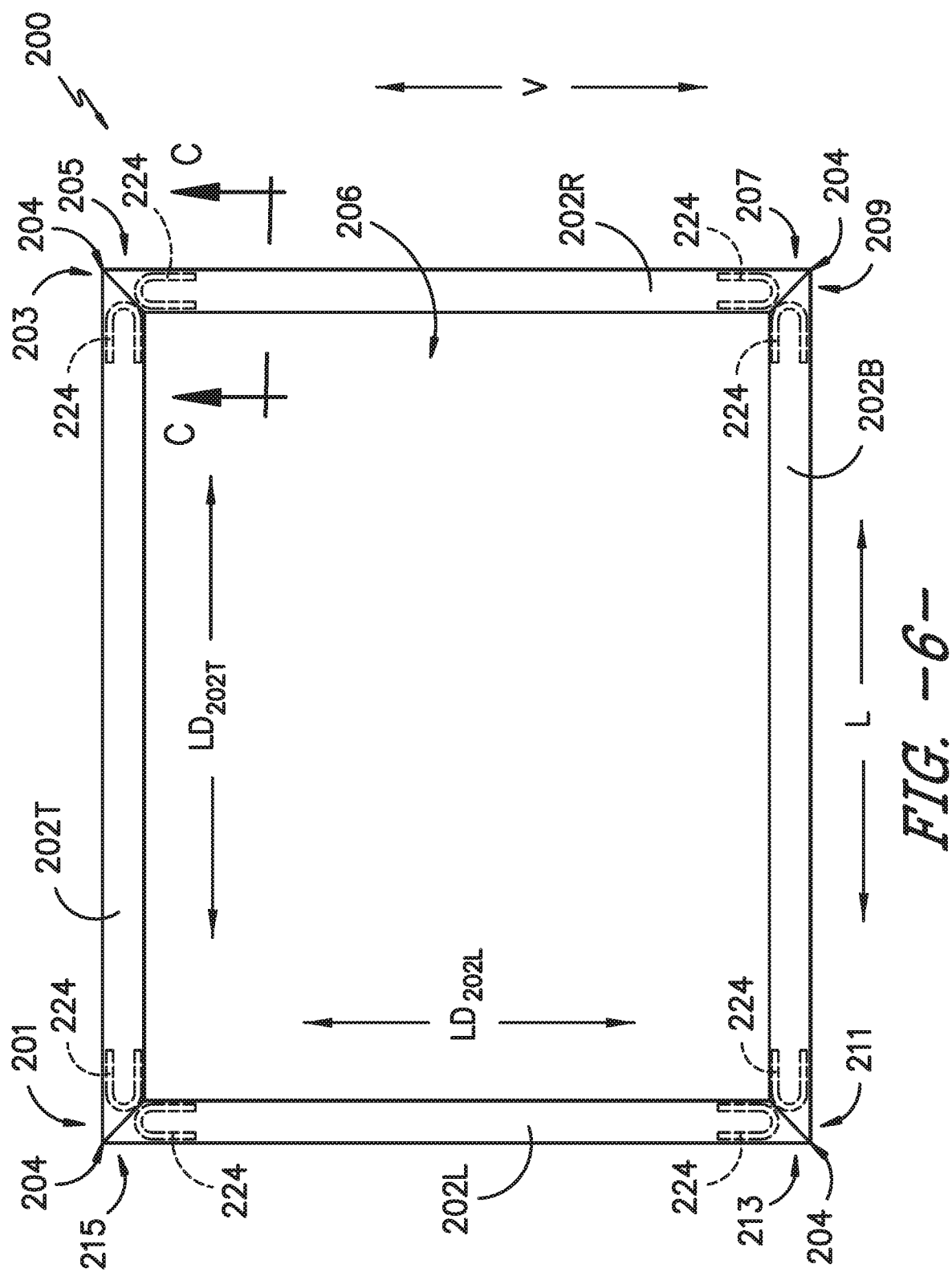
FIG. -6-

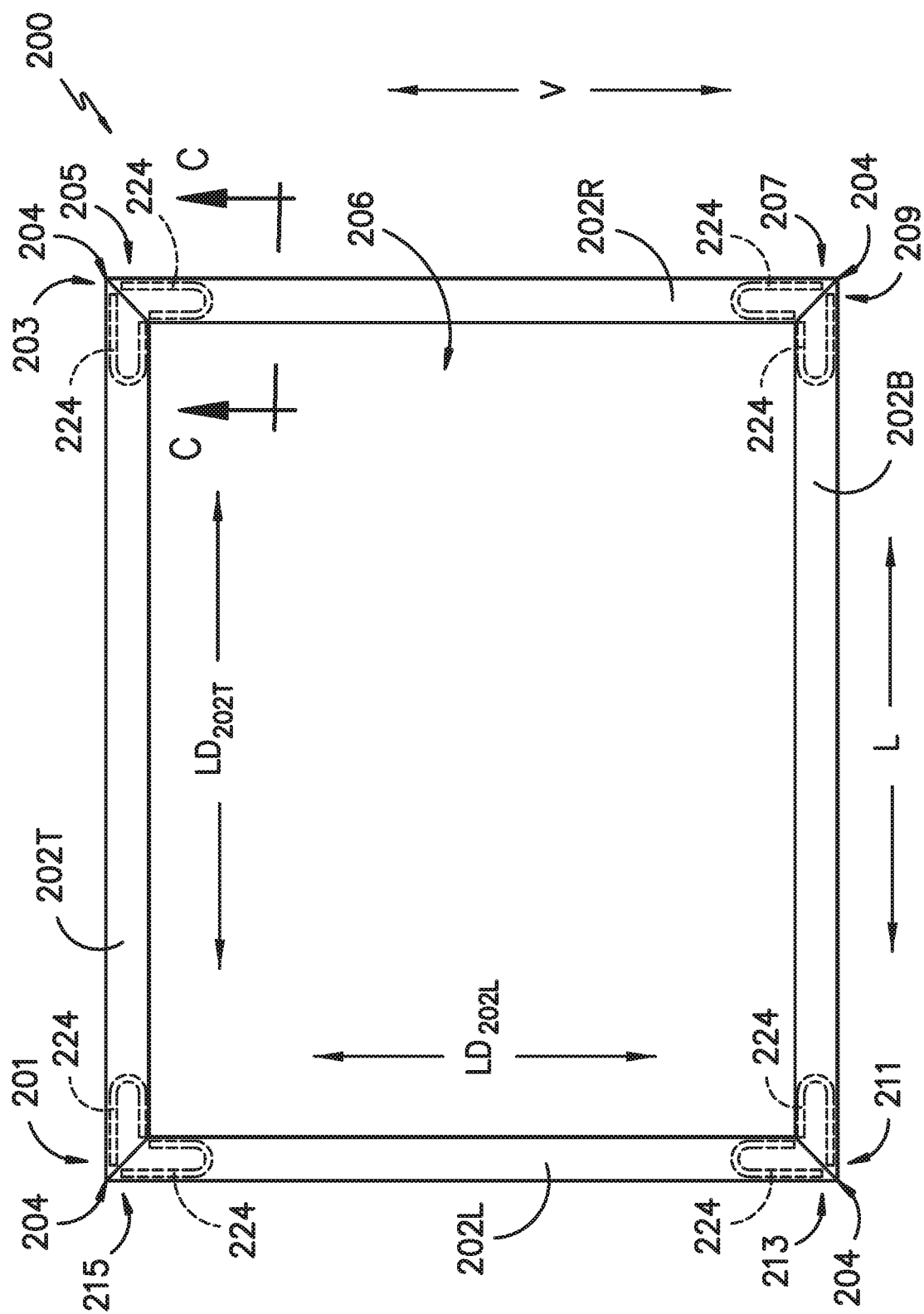

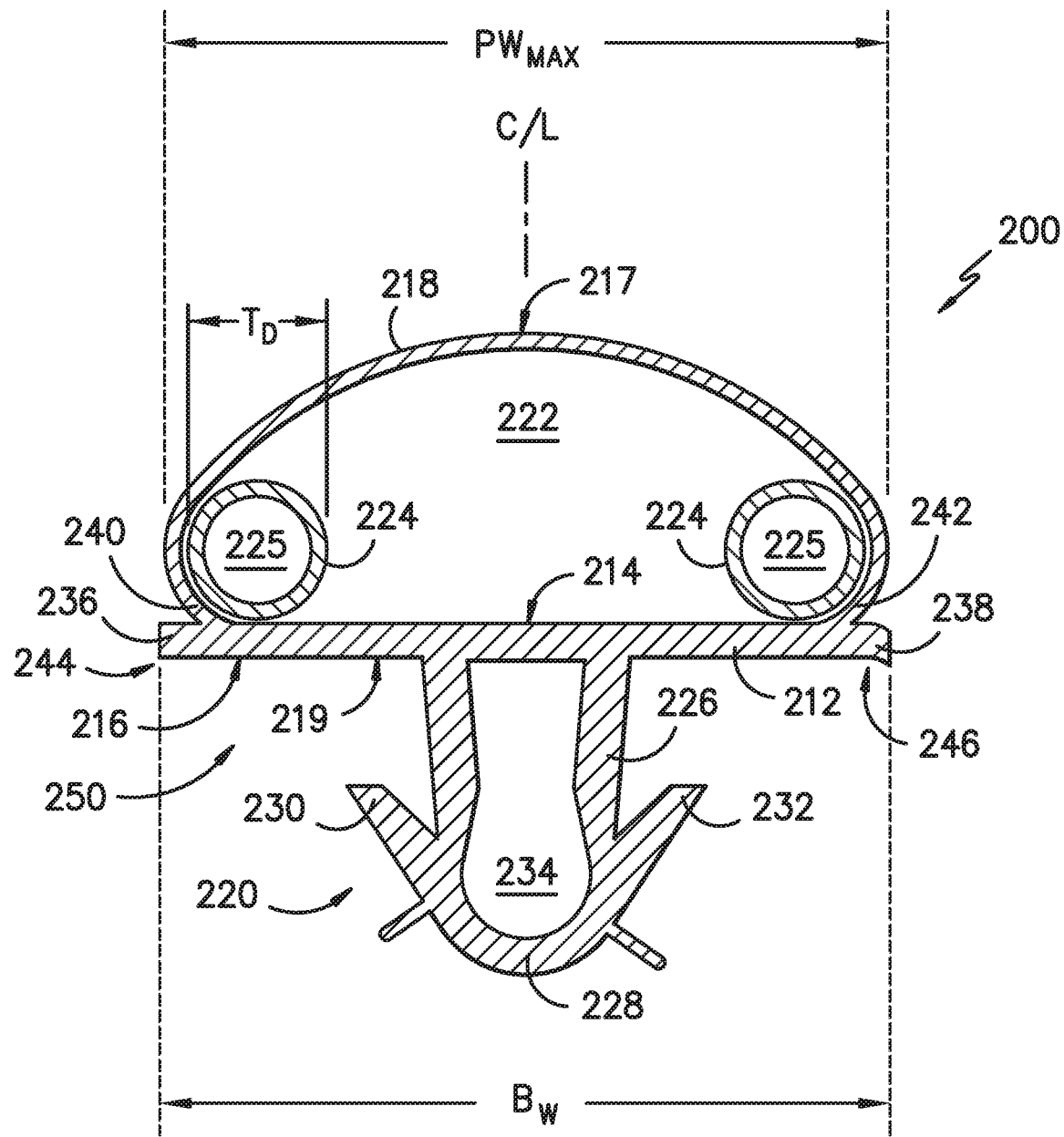
FIG. -8-

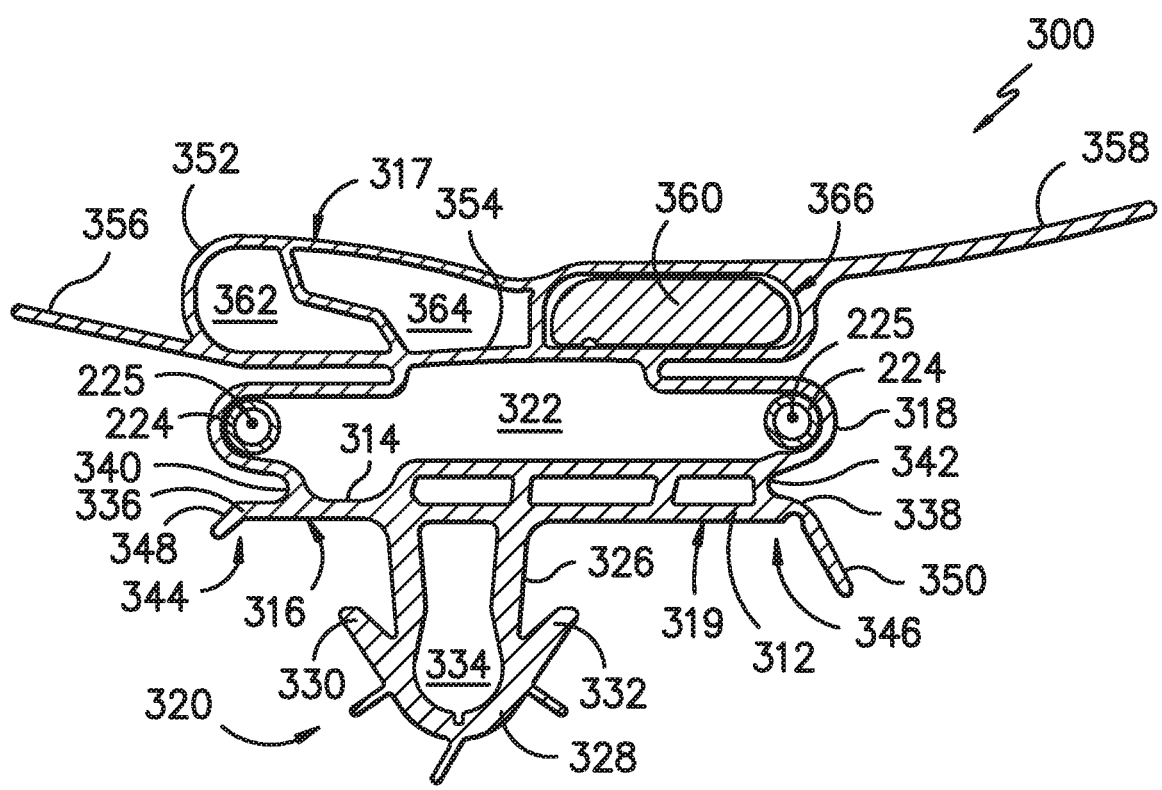
FIG. -9-

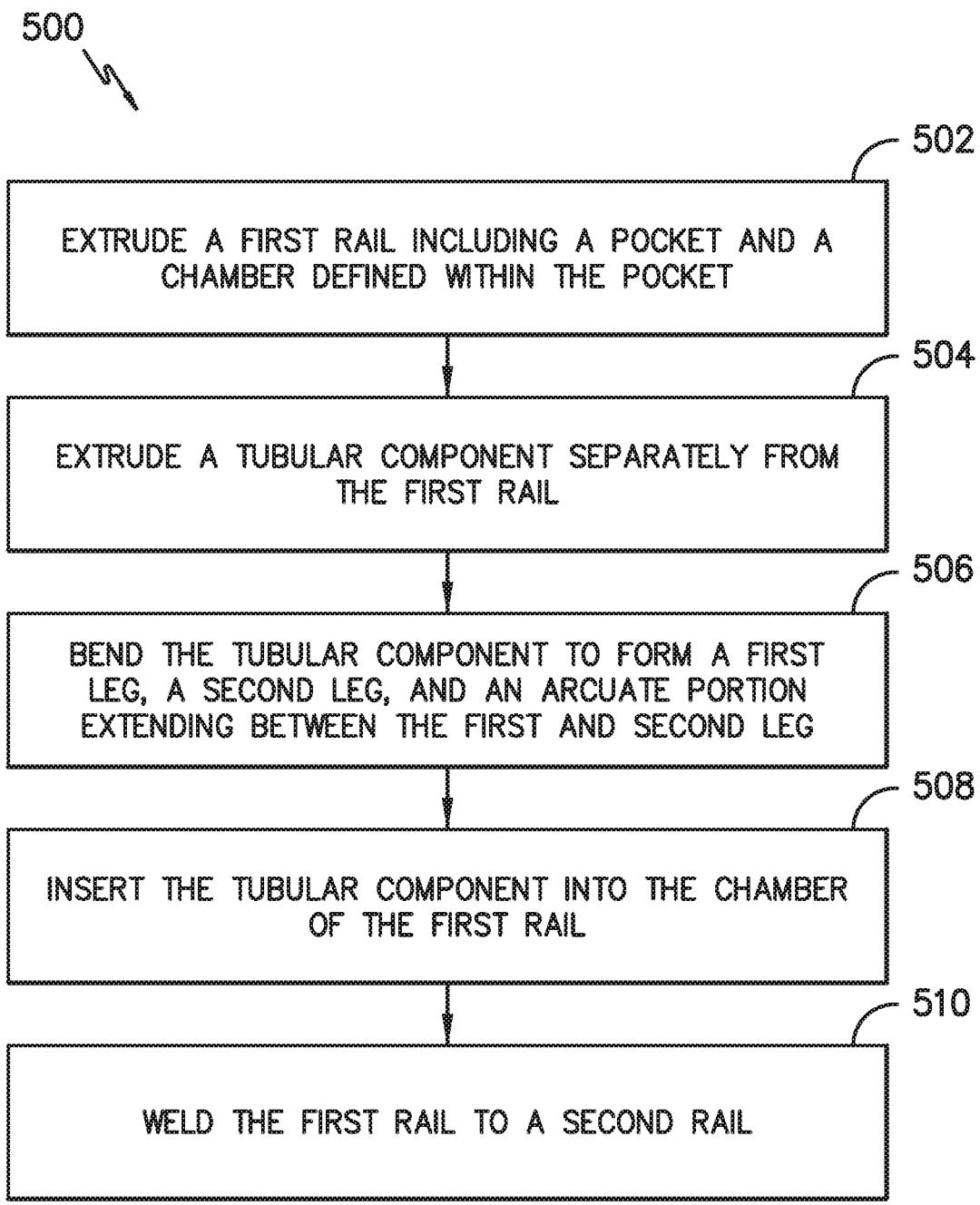
FIG. -10-

APPLIANCE GASKET WITH INTERNAL ARCUATE COMPONENT

FIELD OF THE INVENTION

The subject matter of the present disclosure relates generally to a gasket for an appliance and, more particularly, a resilient gasket for a door of an appliance.

BACKGROUND OF THE INVENTION

Appliances frequently use gaskets to seal the opening of a compartment. For example, the fresh food compartment or freezer compartment of a refrigerator is typically accessible through an opening. Access to the opening may be determined by a door connected by hinges to the rest of the appliance or the door may form part of a drawer. Similarly, the wash compartment of a dishwasher or washing machine is accessed by an opening having a door.

In each example, typically a gasket is positioned on a body of the appliance such as the door. The gasket is positioned so that when the door is in a closed position, the gasket provides a seal around the opening. The seal may prevent liquids from leaking out of the appliance, may prevent ambient air from leaking into the appliance, may prevent energy losses by e.g., preventing warm air from leaking into the appliance and cold air from leaking out of the appliance, and combinations thereof. The gasket may have a shape that is compressed when the door is closed. The compression of the gasket may help to form a seal around the door by closing off any gaps between the door and surfaces around the opening of the appliance. When the door is open, preferably the gasket returns to its original shape because the gasket is no longer compressed between the door and the surface surrounding the opening.

During operation of the appliance, users will frequently open and close the door to access the compartment. Such opening and closing places the gasket in and out of contact with the surface of the appliance surrounding the opening of the compartment being accessed. For a typical gasket, this contact causes the gasket to be flexed. Specifically, the gasket may be compressed, extended, or both as the door is opened and closed. As a result, after a period of time, the gasket may show signs of wear or fatigue. Particularly, cracks may develop along various portions of the gasket particularly at high stress locations where the gasket is bent or flexed from closing and opening of the door.

The gasket may also stay compressed for long periods of time. For example, between the time of manufacture and purchase by the consumer, the door of the appliance may remain closed—causing the gasket to stay compressed. Depending on the length of time, the gasket may develop "memory." In such case, upon opening the door, the gasket fails to return to its original shape. Instead, the gasket retains, in whole or in part, a compressed shape—as if the door was still in a closed position. When the gasket remains compressed, it may leave gaps or openings between the door and the sealing surface of the appliance when the door is closed—resulting in undesired leaks.

The manufacture of the gasket presents certain challenges as well. Conventionally, the gasket could be constructed of foam. In still another example, the gasket may have an internal chamber and formed by extruding a single piece of material forming the gasket. The conventional extrusion process using a die significantly limits the configurations that can be used for the internal chamber.

Accordingly, a gasket with one or more features that improve the lifetime of the gasket would be useful. Such a gasket with improved resiliency and resistance to wear and memory would be particularly helpful. Such a gasket that can be readily manufactured would be beneficial.

BRIEF DESCRIPTION OF THE INVENTION

Aspects and advantages of the invention will be set forth in part in the following description, or may be apparent from the description, or may be learned through practice of the invention.

In one exemplary embodiment, the present disclosure provides a refrigerator appliance. The refrigerator appliance includes a cabinet defining a lateral direction, a transverse direction, and a vertical direction. The lateral direction, the transverse direction, and the vertical direction are mutually perpendicular. The cabinet includes a liner that defines at least one chilled chamber for storing food items. The refrigerator appliance also includes an opening defined by the liner of the cabinet and providing access to the at least one chilled chamber. A door is connected to the cabinet at the opening. The door is rotatable between an open position to permit access to the at least one chilled chamber and a closed position to at least partially enclose the opening. The refrigerator appliance also includes a gasket connected to one of the door and the cabinet. The gasket is positioned to at least partially surround the opening when the door is in the closed position. The gasket includes a plurality of rails. Each rail is connected with an adjacent rail at a weld and each rail extends linearly along a longitudinal direction. The gasket further includes at least one internal component located within a chamber defined within a pocket of one of the rails proximate a respective weld joining the one rail to an adjacent rail. The internal component includes a first leg extending along the longitudinal direction of the gasket from a first end of the internal component to a first side of an arcuate portion of the internal component and a second leg extending along the longitudinal direction of the gasket from a second end of the internal component to a second side of the arcuate portion of the internal component.

In another exemplary aspect, the present disclosure provides a resilient gasket for an appliance. The gasket includes a main body that extends along the longitudinal direction of the gasket. The main body includes a base having an attachment side and a sealing side that is opposite to the attachment side. The attachment side provides an attachment surface for attachment to a body of the appliance. The main body also includes a dart protruding from the attachment side of the base and configured for insertion into the appliance and a pocket attached to the sealing side of the base. The pocket provides a sealing surface for contact around an opening of the appliance. The pocket defines a chamber on the sealing side of the base. The gasket further includes at least one internal component located within the chamber of the pocket. The internal component includes a first leg extending along the longitudinal direction of the gasket from a first end of the internal component to a first side of an arcuate portion of the internal component and a second leg extending along the longitudinal direction of the gasket from a second end of the internal component to a second side of the arcuate portion of the internal component.

In yet another exemplary embodiment, the present disclosure provides a method of making a gasket for an appliance. The method includes extruding a first rail of the gasket. The first rail includes a pocket and a chamber defined within the pocket. The method also includes extruding a tubular component separately from the first rail of the gasket and bending the tubular component to form a first leg, a second leg, and an arcuate portion extending between the first leg and the second leg. The method further includes inserting the tubular component into the chamber of the first rail of the gasket and welding the first rail to a second rail of the gasket after inserting the tubular component into the chamber of the first rail.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a perspective view of an exemplary embodiment of an appliance as may be equipped with an exemplary gasket of the present disclosure.

FIG. 2 is a front view of the exemplary embodiment of an appliance shown in FIG. 1.

FIG. 3 is a view of an exemplary gasket according to one or more embodiments of the present disclosure as viewed from a sealing side.

FIG. 4 is a partially cut-away view of the exemplary gasket of FIG. 3 to reveal exemplary internal components according to one or more embodiments of the present disclosure.

FIG. 5 is a partially cut-away view of the exemplary gasket of FIG. 3 to reveal exemplary internal components according to one or more additional embodiments of the present disclosure.

FIG. 6 is an elevation view of an exemplary gasket including a plurality of internal components according to one or more embodiments of the present disclosure.

FIG. 7 is an elevation view of an exemplary gasket including a plurality of internal components according to one or more additional embodiments of the present disclosure.

FIG. 8 is a cross-sectional view of an exemplary gasket of the present invention in a non-compressed state.

FIG. 9 is a cross-sectional view of another exemplary gasket of the present invention in a non-compressed state.

FIG. 10 is a flowchart illustrating an exemplary method of making a gasket for an appliance according to one or more embodiments of the present disclosure.

The use of the same or similar features in the reference numerals denotes the same or similar features unless otherwise indicated.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, terms of approximation, such as "generally," or "about" include values within ten percent greater or less than the stated value. When used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

FIG. 1 provides a perspective view of a refrigerator appliance 100 according to an exemplary embodiment of the present disclosure. FIG. 2 provides a front, elevation view of refrigerator appliance 100. In the description that follows, refrigerator appliance 100 will be used for purposes of describing exemplary embodiments of the invention. Using the teachings disclosed herein, one of ordinary skill in the art will understand that the present invention may be used with other appliances as well including e.g., dishwashers, washing machines, and others.

In both FIGS. 1 and 2, doors 104, 106, and 108 are shown in an open position. Refrigerator appliance 100 includes a housing or cabinet 102 that extends between a top portion 101 and a bottom portion 103 along a vertical direction V. Cabinet 102 also extends along a lateral direction L and a transverse direction T. The vertical direction V, lateral direction L, and transverse direction T are mutually perpendicular to one another and form an orthogonal direction system.

Cabinet 102 includes an insulated liner 105 that defines chilled chambers for receipt of food items for storage. In particular, liner 105 defines compartments that include a fresh food chamber 116 positioned at or adjacent top 101 of cabinet 102 and a freezer chamber 118 arranged at or adjacent bottom 103 of cabinet 102. The liner 105 may include an insulated divider 110 which separates the fresh food chamber 116 and the freezer chamber 118. Each chamber 116, 118 may be provided with various features such as e.g., shelves 115 and drawers 120. Refrigerator appliance 100 is generally referred to as a bottom mount refrigerator. It is recognized, however, that the benefits of the present disclosure apply to other types and styles of refrigerator appliances such as, e.g., a top mount refrigerator appliance, a side-by-side style refrigerator appliance, or others. Additionally, refrigerator appliance 100 could be provided with other features such as e.g., a dispensing assembly for dispensing liquid water and/or ice, a user interface for controlling or selecting various features, and still other features as well.

Refrigerator doors 104, 106 are rotatably hinged to an edge of cabinet 102 for selectively accessing fresh food chamber 116 through opening 117 defined by inner liner 105. Handles 124 and 126 allow a user to selectively open and close doors 104 and 106. Freezer door 108 is arranged below refrigerator doors 104, 106 for selectively accessing freezer chamber 118 through opening 119. Freezer door 108 is coupled to a freezer drawer 109 slidably mounted within freezer chamber 118. Handle 114 allows a user to selectively open and close door 108.

FIG. 3 illustrates an exemplary embodiment of a resilient gasket 200 of the present invention. As illustrated, for this embodiment gasket 200 is configured as a plurality of rails 202T, 202B, 202L, and 202R that surround an opening 206. A specific rail of the plurality of rails may be identified with respect to a relative position as compared to other rails of the plurality of rails. For example, a top rail 202T and a bottom rail 202B may be spaced apart along the vertical direction V and positioned at opposite ends of the gasket 200 along the vertical direction V. Similarly, the gasket 200 may include a right rail 202R and a left rail 202L spaced apart and opposite one another along the lateral direction L. Each rail 202 is connected with at least two adjacent rails. Each rail 202 extends linearly along a longitudinal direction. For example, rail 202T defines a longitudinal direction $LD_{202T}$ along which rail 202T extends in a linear manner. Rail 202L defines a longitudinal direction $L_{D202L}$ along which rail 202L extends in a linear manner. Rail 202T, for example, is connected at opposing ends 201 and 203 to rails 202L and 202R respectively. Rails 202 may be connected together by e.g., welds 204 created by heating so as to fuse the rails together. Other constructions and methods of connection may be used as well.

Gasket 200 may be placed around an opening in an appliance to provide a seal against fluid leaks (whether gas or liquid), energy leaks, or both. For example, gasket 200 could be placed around opening 117 of fresh food compartment 116. Another gasket 200 could be placed around opening 119 of freezer compartment 118. Gasket 200 could be positioned on cabinet 102 and/or inner liner 105 around openings 117 and 119. Alternatively, gasket 200 could be mounted to door 108 at surface 122, door 104 at surface 125, and/or door 106 at surface 127. Although shown in rectangular form in FIG. 3, gasket 200 can be provided in other shapes and configurations as well.

As may be seen in FIGS. 4 and 5, and as described in more detail below, gasket 200 includes a chamber 222 defined therein. As shown in FIGS. 4 and 5, one or more resilient internal components 224 may be positioned within chamber 222. In particular, the one or more resilient internal components 224 may be positioned at one or more corners of the gasket 200 defined by intersections of two of the rails. For example, FIGS. 4 and 5 illustrate a corner defined by the intersection between top rail 202T and right rail 202R according to various embodiments. The exemplary aspects illustrated in FIGS. 4 and 5 are not limited to this corner, but may be applied at any or all corners of the gasket. Additionally, in some embodiments, the internal component(s) 224 may be positioned in other parts of the gasket 200.

Notably, internal component 224 is not attached to any part of gasket 200, e.g., no adhesives are required between the internal component 224 and the gasket 200, nor are the internal component 224 and the gasket 200 welded or fused together in any way. For example, gasket 200 and internal component 224 may be extruded separately and, afterwards, internal component 224 may be readily inserted into chamber 222.

As may be seen in FIGS. 4 and 5, the at least one internal component 224 includes a first leg 404 extending from a first end 402 of the internal component 224 to a first side 406 of an arcuate portion 408 of the internal component 224 and a second leg 412 extending from a second end 414 of the internal component 224 to a second side 410 of the arcuate portion 408 of the internal component 224. As illustrated, when installed within the chamber 222 of the gasket 200, the first and second legs 404 and 412 are parallel to one another and each extend along the longitudinal direction of the gasket 200. As mentioned, the internal component 224 is a resilient component. Accordingly, the internal component 224 may be resiliently biased outwardly against the sides of the chamber 222 in a direction generally perpendicular to the longitudinal direction. For example, the internal component 224 may be extruded in a linear shape and bent to form the first leg 404, the second leg 412, and the arcuate portion 408. The internal component 224 may then be inserted into the chamber 222, whereupon the resilient internal component 224 may bias outward in the opposite direction of the bend, e.g., the first leg 404 and the second leg 412 of the internal component 224 may resiliently urge to return to the original linear shape of the internal component 224. Thus, the internal component 224 may be held in place within chamber 222 as a result of the outward bias of the internal component 224 in a direction generally perpendicular to the longitudinal direction against the walls of the chamber 222.

Internal component 224 extends along a portion of the length of a rail 202 (FIG. 3) of gasket 200. The at least one internal component 224 may advantageously be located proximate one or more of the welds 204, e.g., at one or both sides of each weld 204. For example, an internal component 224 may be located at or proximate to each of the opposing ends 201 and 203 of rail 202T. Although the at least one internal component 224 is illustrated for example in FIGS. 4 and 5 at the corner of the gasket 200 defined by the rail 202T and the rail 202R, the at least one internal component 224 may be provided at any or all of the welds 204 of the gasket 200. In various embodiments, one internal component 224 may be provided at some or all of the welds 204 of the gasket 200, two internal components 224 may be provided at some or all of the welds 204 of the gasket 200, or various combinations thereof.

In some embodiments, for example as illustrated in FIG. 4, the at least one internal component 224 may be positioned within the chamber 222 with the arcuate portion 408 proximate the weld 204. In other embodiments, for example as illustrated in FIG. 5, the at least one internal component 224 may be positioned within the chamber 222 with the first end 402 and the second end 414 proximate the weld 204. As mentioned, the internal component 224 and the rail 202 may be separately extruded and the internal component 224 may then be inserted into the rail 202. The rails 202 may then be welded together, e.g., at welds 204, to form the gasket 200. Thus, in some embodiments, the arcuate portion 408 of the at least one internal component 224 may be inserted into the rail(s) 202 first, to provide the positioning illustrated in FIG. 5, or the first end 402 and the second end 414 of the internal component 224 may be inserted first to provide the positioning illustrated in FIG. 4.

In some embodiments, the first leg 404 and the second leg 412 may be generally symmetrical, e.g., the length of each of the legs 404 and 412 along the longitudinal direction may be about the same, as illustrated in FIG. 4. In other embodiments, one of the first leg 404 and the second leg 412 may be longer than the other. For example, as illustrated in FIG. 5, the internal component 224 may be positioned such that each of the first end 402 and the second end 414 is proximate the weld 204, e.g., where, as shown, the weld is oblique to the longitudinal direction. Thus, the differing lengths of the first leg 404 and the second leg 412 may accommodate a varying distance from the arcuate portion 408 of the internal component 224 to the weld 204, in order that the internal component 224 may provide support and reinforcement of the gasket 200 as close as possible to the corner(s) of the gasket 200.

As mentioned above, the exemplary aspects illustrated in FIGS. 4 and 5 are not limited to the exemplary corner illustrated therein, but may be applied at any or all corners of the gasket. For example, as illustrated in FIGS. 6 and 7, the gasket 200 may include eight internal components 224. In some embodiments, the gasket 200 may include top rail 202T extending from first end 201 to second end 203, a right rail 202R extending from a first end 205 to a second end 207, a bottom rail 202B extending from a first end 209 to a second end 211, and a left rail 202L extending from a first end 213 to a second end 215. In such embodiments, the gasket 200 may include four corners, each defined at an intersection of a first end of one rail and a second end of an adjacent rail. For example, a first corner may be defined at an intersection of the second end 215 of the left rail 202L with the first end 201 of the top rail 202T. The one or more internal components 224 may be provided at any or all of the four corners of the gasket 200.

It should be recognized that the exemplary gaskets 200 of FIGS. 6 and 7 include eight internal components 224 only to illustrate one possible exemplary embodiment. In various embodiments, any number of the internal components 224 illustrated in FIGS. 6 and 7 may be provided. For example, only one internal component 224 may be provided, which may be any one of the eight illustrated in FIG. 6 or 7. As another example, two internal components 224 may be provided, and may be any two of the eight illustrated in FIG. 6 or 7, e.g., the two internal components 224 may be provided at the same corner, e.g., in second end 203 of top rail 202T and in first end 205 of right rail 202R, or at different corners, e.g., in second end 203 of top rail 202T and in first end 209 of bottom rail 202B. As yet another example, four internal components 224 may be provided, e.g., in two pairs at two corners, one internal component 224 at each corners, or a pair of internal components 224 in one corner with a single internal component in two other corners. In other embodiments, numerous other combinations providing any suitable number of internal components 224 may be included in the gasket 200, e.g., three, five, six, or seven internal components 224.

Additional combinations and variations are also possible, e.g., when two or more internal components 224 are provided, the internal components 224 may vary in position. For example, one internal component 224 may be positioned with the arcuate portion 408 proximate the weld 204 (e.g., as in FIG. 4) and another internal component 224 may be positioned with the ends 402 and 414 proximate the weld 204 (e.g., as in FIG. 5). Such internal components 224 may be positioned at the same corner or different corners.

FIG. 8 provides a cross-sectional view along line C-C in FIG. 3 of the exemplary resilient gasket 200 in an uncompressed condition. Gasket 200 includes a main body 250 that has a base 212. In turn, base 212 has a sealing side 214 and an attachment side 216 and extends between opposing sides 244 and 246. For this exemplary embodiment, gasket 200 is symmetrical about center line C/L.

Attachment side 216 provides an attachment surface 219 for positioning gasket 200 around e.g., openings 117 or 119 of appliance 100. A dart 220 defining a cavity 234 projects orthogonally from attachment surface 219. Dart 220 includes hooks 230, 232 that extend laterally from dart 220. Dart 220 may extend continuously along the length of gasket 200 or may be formed intermittently along surface 219.

One or more slots or openings can be created in a body of the appliance, e.g., one or both of the fresh food doors 104 and 106, the freezer door 108, the cabinet 102, and/or the inner liner 105, for the receipt of dart 220. More particularly, a head 228 of dart 220 is inserted into such openings or slots. During such insertion, the resiliency of dart 220 allows cavity 234 in dart body 226 to collapse as dart 220 is inserted. After insertion, dart 220 can expand and hooks 230, 232 will open within cabinet 102 and/or inner liner 105 to help secure gasket 200 around the opening of the appliance.

Gasket 200 includes a pocket 218 attached to the sealing side 214 of base 212. Pocket 218 provides a sealing surface 217 that extends between intersections 240 and 242 with base 212 on opposing sides 244 and 246 of the centerline C/L of gasket 200. When, e.g., one of the doors 104, 106, and/or 108 is in a closed position, sealing surface 217 contacts appliance 100 entirely around a respective opening 117, 119 to provide a fluid seal—i.e. a seal that does not allow air to move in and out of opening 117.

Pocket 218 defines a chamber 222 between sealing surface 217 and base 212. Due to the resiliency of pocket 218, chamber 222 can flatten or partially collapse when a door of the appliance is in a closed position such that pressure is applied against sealing surface 217. When the door is opened by e.g., a user accessing a compartment of the appliance, pocket 218 can return to its original, uncompressed shape as shown in FIG. 8. Pocket 218 extends along the entire length of rail 202 (FIG. 3) of gasket 200. For this exemplary construction of gasket 200, pocket 218 is attached slightly inward of the opposing lateral sides of base 244, 246 so as to create a pair of opposing steps 236, 238.

For this exemplary embodiment, the internal component 224 is configured as a tube having an internal component cavity 225 and an outside tube diameter $T_D$. Pocket 218 has a maximum pocket width $PW_{MAX}$ along a direction orthogonal to the longitudinal direction (e.g., $LD202_L$ or $LD202_T$) of rail 202. A maximum width of the internal component 224, e.g., a distance from an outer edge of the first leg 404 to an opposite outer edge of the second leg 412, may be approximately equal to $PW_{MAX}$, e.g., excepting the wall thickness of the pocket 218.

Additionally, base 212 has a base width $B_W$ along a direction orthogonal to the longitudinal direction (e.g., $LD202_L$ or $LD202_T$) of rail 202. In one exemplary embodiment, maximum pocket width $PW_{MAX}$ of pocket 218 is approximately equal to the base width $B_W$. In another embodiment, maximum pocket width $PW_{MAX}$ of pocket 218 is less than base width $B_W$. Other constructions may also be used.

Internal component 224 is constructed of a resilient material and provides support for pocket 218. Accordingly, when pocket 218 is compressed, internal component 224 provides an additional spring-like action for pocket 218 that helps gasket 200 maintain a seal even as pocket 218 wears. Specifically, when pocket 218 is compressed as a door of appliance 100 is placed into a closed position, chamber 222 can flatten or collapse but is supported by the resiliency of internal component 224—which helps control the amount of flattening and other deformation of chamber 222. When pocket 218 is uncompressed as a door of appliance 100 is opened, internal component 224 helps return pocket 218 to its original uncompressed state—or close thereto—as shown in FIG. 8. In addition, the resiliency of internal component 224 helps prevent gasket 200 from having memory if pocket 218 is compressed for relatively long periods of time such as e.g., during shipping and warehousing of appliance 100.

Internal component 224 and pocket 218 may be constructed from the same or different materials. For example, plastics such as polyvinyl chloride, polyurethanes, and others may be used for the construction of gasket 200 including pocket 218 and internal component 224. Advantageously, internal component 224 and pocket 218 may also be constructed from different materials. More particularly, because internal component 224 is not attached to pocket 218, it may be e.g., extruded separately from a different material having a different resiliency or other properties. Such allows a designer to carefully select or refine the overall resiliency of gasket 200.

For example, internal component 224 can have a first durometer value $IC_D$ on the Shore A hardness scale and pocket 218 can have as second durometer value $P_D$ on the Shore A hardness scale. As used herein, Shore A hardness refers to a durometer scale identified in ASTM D2240 type A. In one exemplary embodiment of the present invention, first durometer value $IC_D$ of internal component 224 is greater than second durometer value $P_D$ of pocket 218. In another embodiment, first durometer value $IC_D$ of internal component 224 is the same as second durometer value $P_D$ of pocket 218. In yet another embodiment, first durometer value $IC_D$ of internal component 224 is less than second durometer value $P_D$ of pocket 218. In still another embodiment of the invention, first durometer value $IC_D$ of internal component 224 may be in the range of about 10 Shore A to about 100 Shore A, and second durometer value $P_D$ of pocket 218 may be in the range of about 50 Shore A to 80 Shore A. Other relative values may be used as well.

The resiliency of gasket 200 can also be adjusted by varying the thickness of one or more components. For example, the thickness of main body 250 could be modified. Pocket 218 could be created with e.g., a thicker wall to increase its resiliency. Similarly, internal component 224 could be created with e.g., a thicker wall to increase its resiliency. Other configurations may be used as well.

FIG. 9 provides another cross-sectional view of an exemplary embodiment of a gasket 300 of the present invention. As with the embodiment of FIG. 8, gasket 300 includes a base 312 having an attachment side 316 and a sealing side 314. A dart 320 with body 326, cavity 334, and head 328 extends orthogonally from an attachment surface 319 on the attachment side 316 of the base 312. Flanges 348 and 350 extend from the opposing pair of lateral steps 336, 338 on each lateral side of gasket 300. Flanges 348 and 350 can help cover portions of inner liner 105 and/or cabinet 102.

Gasket 300 includes a first pocket 318 attached to sealing side 314 of base 312. The first pocket 318 is joined to the base 312 at intersections 340 and 342 on either side 344 and 346, respectively, of the base 312. Pocket 318 defines a chamber 322 into which internal component 224 is received in a similar manner as described above with respect to FIGS. 4 through 8. A second pocket 352 is attached to pocket 318 and is divided into secondary chambers 362, 364, and 366. The second pocket 352 is separated from the first pocket 318 by a wall 354. The wall 354 partially defines the chamber 322 of the first pocket 318 on one side of the wall 354 and partially defines the chamber 364 of the second pocket 352 on an opposite side of the wall 354. A magnet 360 is contained within secondary chamber 366. Second pocket 352 includes ledges 356 and 358 that extend outward from gasket 300 and a sealing surface 317 between the ledges 356 and 358. Ledges 356 and 358 can be used to e.g., provide further covering of inner liner 105 or cabinet 102 from a user's view.

Accordingly, as a door of appliance 100 is opened and closed, magnet 360 pulls gasket 300 towards a ferrous component of inner liner 105 and/or cabinet 102 to help form a seal when the door is in the closed position. As with gasket 200, gasket 300 is constructed of one or more resilient materials. In FIG. 9, gasket 300 is shown in a non-compressed condition as it would take when a door of appliance 100 is in an open position. In a closed position, gasket 300 can be compressed so as to flatten or partially collapse pockets 318, 352 and chambers 322, 362, and 364.

As with the embodiment of FIG. 8, the internal component 224 provides additional resiliency and is not attached to any other portion of gasket 300 including base 312 and pocket 318. Additionally, the materials of construction of internal component 224 may be different than pockets 318, 352 allowing for the same or different resiliency (e.g., durometer values) of internal component 224 relative to the other components of gasket 300.

The internal components 224 used in the exemplary gasket of the present invention may have a variety of different shapes, which can affect resiliency. The embodiments of FIGS. 8 and 9 depicted tubular internal components 224 having a circular cross-section as shown. However, other cross-section shapes may be used including e.g., square, rectangular, and elliptical.

Additional embodiments of the present disclosure include methods of making a gasket for an appliance, such as the exemplary method 500 illustrated in FIG. 10. The method 500 may include a step 502 of extruding a first rail of the gasket. The first rail may include a pocket and a chamber defined within the pocket. The method 500 may also include a step 504 of extruding a tubular component separately from the first rail of the gasket. The tubular component may be bent to form a first leg, a second leg, and an arcuate portion extending between the first leg and the second leg, e.g., as illustrated at step 506 of the method 500.

In various embodiment, the method 500 may include a step 508 of inserting the tubular component into the chamber of the first rail of the gasket. For example, in some embodiments, the step 508 of inserting the tubular component may include compressing the first leg and the second leg of the tubular component towards one another. In such embodiments, the tubular component is resiliently biased against the pocket of the first rail after inserting the tubular component into the chamber, e.g., as the resilient material of the tubular component urges the first and second leg outwardly in a direction generally perpendicular to the longitudinal direction. In some embodiments, the step 508 of inserting the tubular component comprises inserting the arcuate portion of the tubular component into the chamber of the first rail first. In other embodiments, the step 508 of inserting the tubular component may include inserting the first leg and the second leg of the tubular component into the chamber of the first rail first. After inserting the tubular component into the chamber of the first rail, the tubular component forms an internal component of the gasket.

Lastly, the method 500 may include a step 510 of welding the first rail to a second rail. For example, the first rail and the second rail may each include a plastic material and the ends of each rail may be melted with radiant heat and joined to form a weld. In other embodiments, any suitable welding technique may be used, such as solvent welding. In at least some exemplary embodiments, the method may also include inserting a second tubular component into the second rail prior to welding the first rail and the second rail. Further, some embodiments of the method may include welding any number of additional rails to one or both of the first and second rails, e.g., a third rail, a fourth rail, etc.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A refrigerator appliance, comprising:
a cabinet defining a lateral direction, a transverse direction, and a vertical direction, the lateral direction, the transverse direction, and the vertical direction are mutually perpendicular, the cabinet including a liner that defines at least one chilled chamber for storing food items;
an opening defined by the liner of the cabinet and providing access to the at least one chilled chamber;
a door connected to the cabinet at the opening, the door rotatable between an open position to permit access to the at least one chilled chamber and a closed position to at least partially enclose the opening; and
a gasket connected to one of the door and the cabinet, the gasket positioned to at least partially surround the opening when the door is in the closed position, the gasket comprising a plurality of rails, each rail connected with an adjacent rail at a weld, each rail extending linearly along a longitudinal direction, the gasket further comprising at least one internal component held in place only through its own tension within a chamber defined within a pocket of one of the rails proximate a respective weld, the respective weld joining the one rail to an adjacent rail, the internal component comprising a first leg extending along the longitudinal direction of the gasket from a first end of the internal component to a first side of an arcuate portion of the internal component and a second leg extending along the longitudinal direction of the gasket from a second end of the internal component to a second side of the arcuate portion of the internal component.

2. The refrigerator appliance of claim 1, wherein the internal component comprises a resilient material and the internal component is biased against the pocket in a direction generally perpendicular to the longitudinal direction.

3. The refrigerator appliance of claim 1, wherein the internal component is positioned in a top rail of the gasket.

4. The refrigerator appliance of claim 1, wherein the at least one internal component is a first internal component, further comprising a second internal component positioned at an opposite side of the respective weld from the first internal component.

5. The refrigerator appliance of claim 1, wherein the arcuate portion of the internal component is positioned proximate the respective weld.

6. The refrigerator appliance of claim 1, wherein the first end and the second end of the internal component are positioned proximate the respective weld.

7. The refrigerator appliance of claim 1, wherein the internal component has a first durometer and the pocket has a second durometer, and wherein the first durometer is greater than the second durometer.

8. The refrigerator appliance of claim 1, wherein the at least one internal component is a first internal component positioned in a top rail of the gasket, further comprising a second internal component positioned in a bottom rail of the gasket, the bottom rail of the gasket positioned opposite the top rail of the gasket.

9. A resilient gasket for an appliance, the gasket defining a longitudinal direction, the gasket comprising:
a main body that extends along the longitudinal direction of the gasket and includes:
a base having an attachment side and a sealing side that is opposite to the attachment side, the attachment side providing an attachment surface for attachment to a body of the appliance;
a dart protruding from the attachment side of the base and configured for insertion into the appliance; and
a pocket attached to the sealing side of the base, the pocket providing a sealing surface for contact around an opening of the appliance, the pocket defining a chamber on the sealing side of the base;
the gasket further comprising at least one internal component held in place only through its own tension within the chamber of the pocket, the internal component comprising a first leg extending along the longitudinal direction of the gasket from a first end of the internal component to a first side of an arcuate portion of the internal component and a second leg extending along the longitudinal direction of the gasket from a second end of the internal component to a second side of the arcuate portion of the internal component.

10. The gasket for an appliance as in claim 9, wherein the internal component comprises a resilient material and the internal component is biased against the pocket in a direction generally perpendicular to the longitudinal direction.

11. The gasket for an appliance as in claim 9, wherein the gasket comprises a top rail and the internal component is located within the top rail of the gasket.

12. The gasket for an appliance as in claim 9, wherein the gasket comprises at least two rails joined at a weld, and the at least one internal component includes a first internal component positioned proximate the weld and a second internal component positioned proximate the weld at an opposite side of the weld from the first internal component.

13. The gasket for an appliance as in claim 9, wherein the gasket comprises at least two rails joined at a weld, and the arcuate portion of the internal component is positioned proximate the respective weld.

14. The gasket for an appliance as in claim 9, wherein the gasket comprises at least two rails joined at a weld, and the first end and the second end of the internal component are positioned proximate the respective weld.

15. The gasket for an appliance as in claim 9, wherein the internal component has a first durometer and the pocket has a second durometer, and wherein the first durometer is greater than the second durometer.

16. A method of making a resilient gasket for an appliance, the method comprising:
extruding a first rail of the gasket, the first rail comprising a main body, the main body including a base having an attachment side and a sealing side that is opposite to the attachment side, the attachment side providing an attachment surface for attachment to a body of the appliance, a dart protruding from the attachment side of the base and configured for insertion into the appliance, and a pocket attached to the sealing side of the base, the pocket providing a sealing surface for contact around an opening of the appliance, and a chamber defined within the pocket on the sealing side of the base;
extruding a tubular component separately from the first rail of the gasket;
bending the tubular component to form a first leg, a second leg, and an arcuate portion extending between the first leg and the second leg;
inserting the tubular component into the chamber of the first rail of the gasket, the tubular component being held in place only through its own tension; and welding the first rail to a second rail of the gasket after inserting the tubular component into the chamber of the first rail.

17. The method of claim 16, wherein the step of inserting the tubular component comprises compressing the first leg and the second leg of the tubular component towards one another, wherein the tubular component is resiliently biased against the pocket of the first rail after inserting the tubular component into the chamber.

18. The method of claim 16, wherein the step of inserting the tubular component comprises inserting the arcuate portion of the tubular component into the chamber of the first rail first.

19. The method of claim 16, wherein the step of inserting the tubular component comprises inserting the first leg and the second leg of the tubular component into the chamber of the first rail first.

20. The method of claim 16, further comprising inserting a second tubular component into the second rail of the gasket before welding the first rail to the second rail.

* * * * *